(12) United States Patent
Vilajosana et al.

(10) Patent No.: US 10,539,474 B2
(45) Date of Patent: Jan. 21, 2020

(54) OBJECT GENERATION TEMPERATURE MEASUREMENT

(71) Applicant: HEWLETT-PACKARD DEVELOPMENT COMPANY, L.P., Houston, TX (US)

(72) Inventors: Xavier Vilajosana, Sant Cugat del Valles (ES); Pere Tuset, Sant Cugat del Valles (ES); Diego Javier Mostaccio, Barcelona (ES)

(*) Notice: Subject to any disclaimer, the term of this patent is extended or adjusted under 35 U.S.C. 154(b) by 197 days.

(21) Appl. No.: 15/562,786

(22) PCT Filed: Jul. 21, 2015

(86) PCT No.: PCT/EP2015/066675
§ 371 (c)(1),
(2) Date: Sep. 28, 2017

(87) PCT Pub. No.: WO2017/012656
PCT Pub. Date: Jan. 26, 2017

(65) Prior Publication Data
US 2018/0052064 A1 Feb. 22, 2018

(51) Int. Cl.
*G01K 13/10* (2006.01)
*B33Y 10/00* (2015.01)
(Continued)

(52) U.S. Cl.
CPC ............ *G01K 13/10* (2013.01); *B29C 64/393* (2017.08); *B33Y 10/00* (2014.12); *B33Y 30/00* (2014.12); *B33Y 50/02* (2014.12); *B29C 64/153* (2017.08)

(58) Field of Classification Search
CPC ........ G01K 13/10; B33Y 10/00; B33Y 30/00; B33Y 50/02; B29C 64/386; B29C 64/393; B29C 64/153; B29C 64/165
See application file for complete search history.

(56) References Cited

U.S. PATENT DOCUMENTS

| 7,045,738 B1 * | 5/2006 | Kovacevic | B05B 7/144 219/121.63 |
| 7,515,986 B2 | 4/2009 | Huskamp | |

(Continued)

FOREIGN PATENT DOCUMENTS

| JP | 2010230452 | 10/2010 |
| WO | WO-2004056509 | 7/2004 |

OTHER PUBLICATIONS

Wegner, et al.; "Process Monitoring in Laser Sintering Using Thermal Imaging"; Aug. 17, 2011; http://sffsymposium.engr.utexas.edu/Manuscripts/2011/2011-30-Wegner.pdf.

*Primary Examiner* — Lisa M Caputo
*Assistant Examiner* — Philip L Cotey

(57) ABSTRACT

In some examples, a method comprises sensing a temperature of a plurality of sub-regions of a portion of a layer of build material in an object generation apparatus. A frequency distribution of sub-region temperatures may be derived therefrom and it may be determined whether the frequency distribution is bimodal. If the frequency distribution is not bimodal, a build material temperature zone is identified. If however the frequency distribution is bimodal, a fusing build material temperature zone and a non-fusing build material temperature zone are identified. The method may further comprise determining a nominal temperature of the at least one identified temperature zone.

20 Claims, 4 Drawing Sheets

(51) Int. Cl.
*B33Y 30/00* (2015.01)
*B33Y 50/02* (2015.01)
*B29C 64/393* (2017.01)
*B29C 64/153* (2017.01)

(56) References Cited

U.S. PATENT DOCUMENTS

| | | | | |
|---|---|---|---|---|
| 7,718,933 | B2 | 5/2010 | Huskamp | |
| 8,137,739 | B2* | 3/2012 | Philippi | B29C 64/153 |
| | | | | 427/8 |
| 9,522,426 | B2* | 12/2016 | Das | B22F 3/1055 |
| 2004/0200816 | A1 | 10/2004 | Chung et al. | |
| 2007/0196561 | A1* | 8/2007 | Philippi | B29C 64/153 |
| | | | | 427/8 |
| 2008/0262659 | A1 | 10/2008 | Huskamp | |
| 2009/0152771 | A1* | 6/2009 | Philippi | B33Y 10/00 |
| | | | | 264/410 |
| 2009/0206065 | A1* | 8/2009 | Kruth | B22F 3/1055 |
| | | | | 219/121.66 |
| 2013/0030723 | A1* | 1/2013 | Gao | B29C 45/77 |
| | | | | 702/50 |
| 2014/0163717 | A1* | 6/2014 | Das | B22F 3/1055 |
| | | | | 700/119 |
| 2015/0061195 | A1 | 3/2015 | DeFelice et al. | |
| 2015/0097307 | A1* | 4/2015 | Batchelder | B29B 13/022 |
| | | | | 264/40.6 |
| 2015/0165524 | A1 | 6/2015 | Ljungblad et al. | |
| 2016/0224017 | A1* | 8/2016 | Huang | B22F 3/1055 |
| 2016/0325496 | A1* | 11/2016 | De Pena | B33Y 10/00 |
| 2017/0151722 | A1* | 6/2017 | Prasad | B29C 67/00 |
| 2017/0182562 | A1* | 6/2017 | Das | B22F 3/1055 |
| 2017/0341307 | A1* | 11/2017 | Vilajosana | B29C 35/0288 |

\* cited by examiner

OBJECT GENERATION TEMPERATURE MEASUREMENT

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, fluid or sheet material.

In some such processes, energy may be applied to a build material. For example, energy may be applied to preheat the build material to a temperature which is close to its melting point. Energy may also be applied to cause melting, so that regions of the build material may fuse to form portions of an object.

BRIEF DESCRIPTION OF DRAWINGS

Examples will now be described, by way of non-limiting example, with reference to the accompanying drawings, in which.

DETAILED DESCRIPTION

Additive manufacturing systems may use object generation apparatus to generate an object. This may comprise selectively solidifying regions of build material within an object generation apparatus according to a model, for example a computer aided design (CAD) model. Such selective solidification may be caused by applying energy in a directional fashion (for example using a laser to cause fusing of build material). In other examples, an agent may be selectively applied to build material, the agent causing the build material to which agent has been applied to fuse more readily than surrounding untreated material when energy is applied. Additive manufacturing may be carried out in a layer-wise manner, with a layer of build material being supplied and treated so as to cause selective fusing thereof, before a further layer of build material is disposed on the treated layer, and itself treated, and so on.

Figure 1:
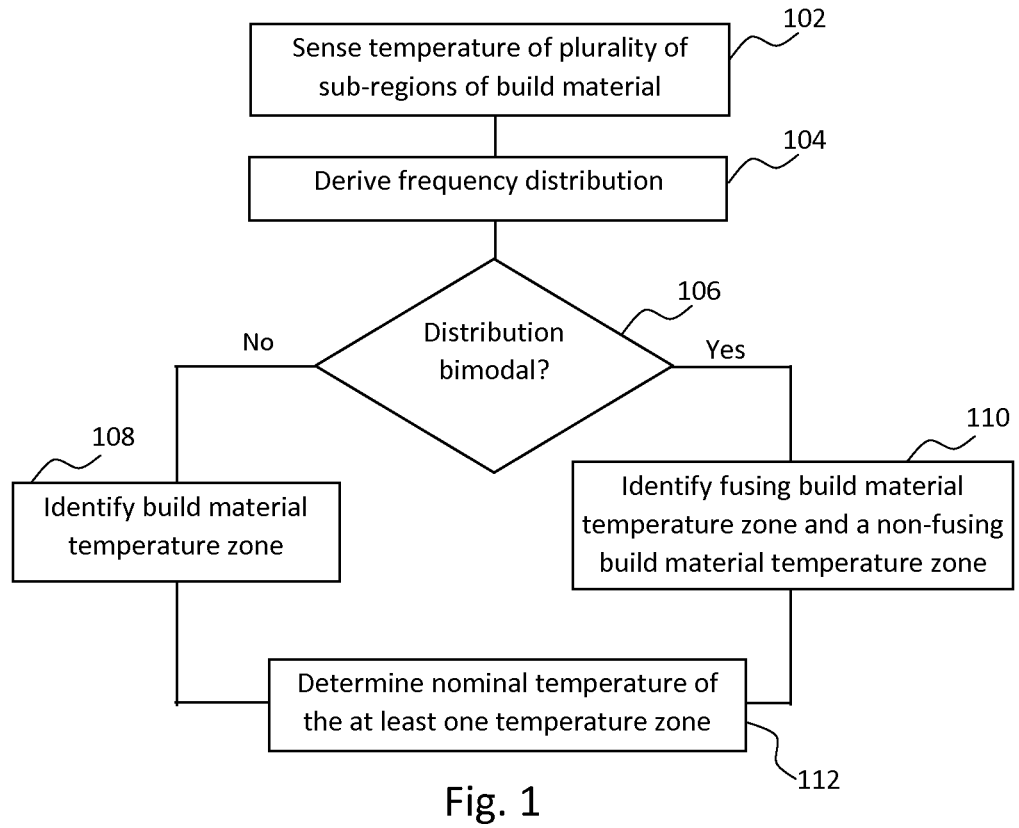
FIG. 1 is a flow chart of an example of a method of determining a nominal temperature for build material in an object generation apparatus.

FIG. 1 is an example of a method in which, in block 102, the temperature of a plurality of sub-regions of at least a portion of a layer of build material within an object generation apparatus is sensed. In some examples, this may comprise sensing a surface temperature of a quantity of build material (which may comprise a thermal contribution from build material under the surface). The build material may be a fusible build material, for example a heat fusible build material. The sensing may be carried out during processes to cause the selective fusing thereof to generate a three-dimensional object. A temperature may for example be measured by at least one of an infra-red sensor, a thermal imaging camera, a thermopile array, or the like. The layer of build material may for example be arranged on a print bed within an object generation apparatus. The sub-regions may be spatially discrete and contiguous, for example having predetermined dimensions which may be same for all sub-regions or may differ between sub-regions, over the surface of a layer of build material. The portion of the layer of build material may, for example, extend over just part of a layer of build material. In some examples, a layer is divided into a plurality of portions, which may be discrete and contiguous and, taken together, at least substantially cover the whole layer. Each of the portions may comprise a plurality of sub-regions.

In block 104, a frequency distribution of sub-region temperatures is determined. As is described in greater detail below, this may comprise assigning each sub-region (or pixel of a thermal image or the like representing the temperature of a sub-region) to a bin comprising a predetermined range of temperatures, and determining the number of sub-regions/pixels in each bin.

Block 106 comprises identifying if the frequency distribution is bimodal, i.e. if it comprises two distinct peaks. If the distribution is not bimodal (for example, the distribution is unimodal), a (single) build material temperature zone is identified (block 108). If, however, the distribution is bimodal, a fusing build material temperature zone and a non-fusing build material temperature zone are identified within the layer (block 110). Identifying a temperature zone provides an indication of whether there is one or two states of build material—for example, whether all the build material in the portion is one of fusing or non-fusing, or whether the portion comprises both fusing and non-fusing build material. Identification of a temperature zone may be made in a temperature, and not a spatial, domain. In other words, identifying temperature zone need not comprise identifying one or more spatial regions within the build material, and the sub-regions need not be individually associated with a temperature zone.

In block 112, a nominal temperature of the at least one identified temperature zone is determined. The nominal temperature may in some examples be the central temperature in a temperature 'bin' having the highest or second highest number of sub-regions therein, or may be an average temperature. Both fusing build material and non-fusing build material will, in practice, be at a range of temperatures due to the nature of heat distribution. However, a nominal temperature may represent the temperature of fusing or non-fusing material. In some examples, for a bimodal distribution, the central temperature of the higher temperature bin is determined to provide the nominal temperature of the fusing build material temperature zone and the central temperature of the lower temperature bin is determined to provide the nominal temperature of the non-fusing material temperature zone. Where a single temperature zone is identified, the nominal temperature may be a mean of the temperatures of the frequency distribution or the temperatures as measured, or a modal temperature, or may be some other value based on the measured temperatures. A nominal temperature may therefore indicate an average or modal temperature for a zone, and this can be used to draw conclusions about the performance of the apparatus, for example if the build material is within a temperature range which indicates fusing is likely to be effective or complete, or is within a temperature range indicating that the object may exhibit or lack intended properties, such as strength and the like. In some examples, as set out in greater detail below, the method may be used as part of a control loop, for example to control temperatures within an object generation apparatus.

It will be noted that the nominal temperature of the, or each, temperature zone has been determined without reference to any external values. Therefore, a determined nominal temperature is not influenced by any constraints based on an external data value, nor is it based on any assumptions as to what temperatures a zone may be expected to have. Furthermore, prior knowledge of, for example, the melting temperature of a particular build material is not needed to categorise build material as fusing and non-fusing based on its temperature.

Figure 2:
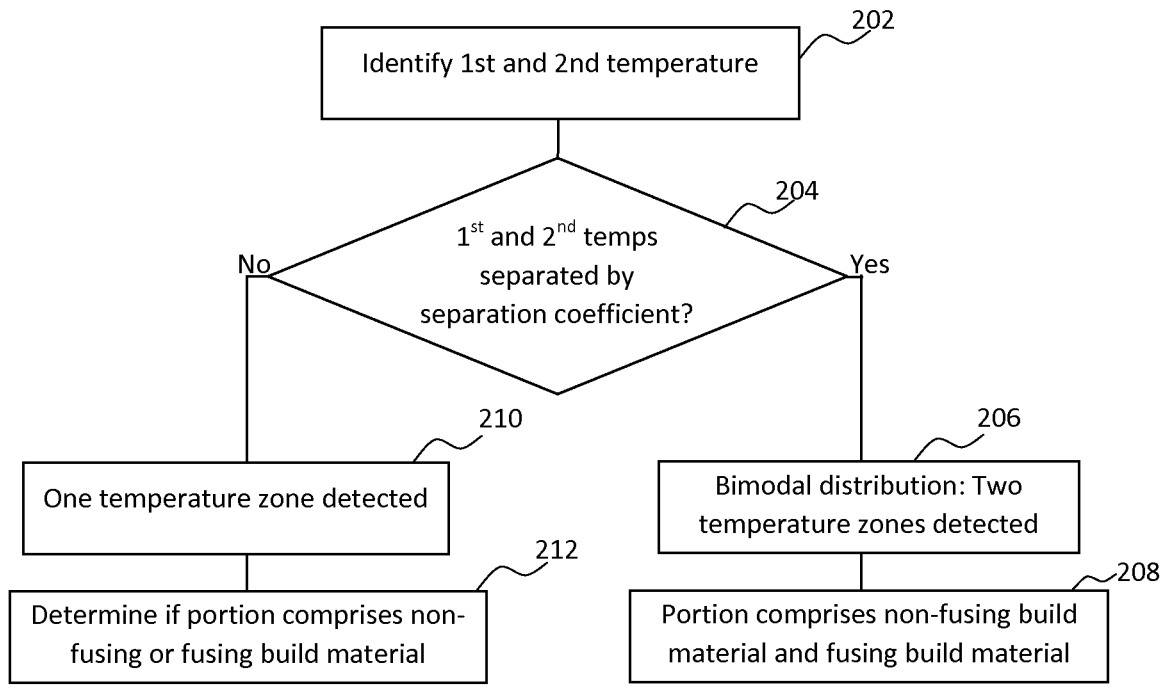
FIG. 2 is an example of a method of determining if a build material comprises a fusing and/or a non-fusing build material temperature zone.

FIG. 2 is an example of a method to carry out blocks 106-110 of FIG. 1.

In this example, identifying if the distribution is bimodal comprises identifying, from within the frequency distribution, a first and second temperature, wherein the first and second temperatures have the two highest frequencies within the frequency distribution (block 202). If, in block 204 it is determined that the first and second temperatures are separated by at least a separation coefficient, it is determined that the distribution is a bimodal distribution and there are two distinct temperature zones (block 206). The separation coefficient may be, for example, be based on the standard deviation, or on some other measure which varies with the form (for example, the spread or variability) of a frequency distribution. In one example, the separation coefficient is two standard deviations of the frequency distribution.

If there are two distinct temperature zones, it is determined, in block 208, that the portion of build material comprises a non-fusing build material and a fusing build material. However, if the separation is less than the separation coefficient, the portion of build material is determined to have just one distinct temperature zone (block 210), and it is determined whether the temperature of that temperature zone is indicative of fusing build material or non-fusing build material (block 212).

Figure 3:
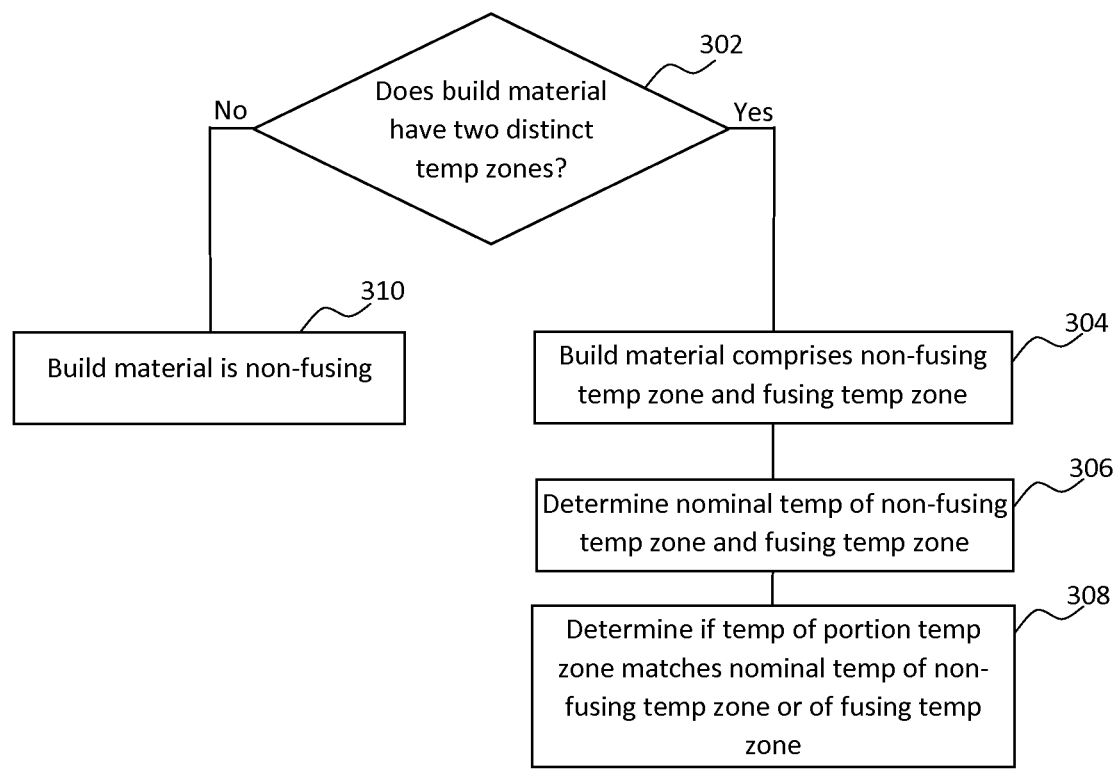
FIG. 3 is a flow chart of an example of a method of determining if a portion of build material comprises a fusing or a non-fusing build material temperature zone.

FIG. 3 is an example of a method to carry out block 212 of FIG. 2. In block 302, it is determined over the layer of build material (for example, over a whole layer of build material arranged on a print bed), if the build material has two distinct temperature zones. In some examples, the layer comprises a plurality of portions (which may be contiguous), and the temperature may be sensed over all such portions. Indeed, the processes described in relation to FIGS. 1 and 2 may be carried out for a number of, or for each, portion of the layer. In one example, temperature zones are considered to be distinct if there is a separation of at least a separation coefficient between the two highest peaks within a temperature frequency distribution for the sub-regions of a layer of build material as a whole (i.e. the frequency distribution for the sub-regions of the layer of build material as a whole is bimodal). The separation coefficient may be, for example, be based on the standard deviation, or on some other measure which varies with the form (for example, the spread or variability) of a frequency distribution. The separation coefficient may be the same or different to that used in block 202.

If there are two distinct temperature zones, in block 304, it is determined that the build material comprises a non-fusing build material temperature zone and a fusing build material temperature zone. A nominal temperature of the temperature zones is determined (block 306), for example as set out in relation to block 108 above. In block 308, it is determined if the temperature of a temperature zone of the portion of build material under consideration matches the temperature of the fusing build material temperature zone or the non-fusing build material temperature zone. For example, a difference between the nominal temperature of the single temperature zone of the portion under consideration and nominal temperatures for each of the temperature zones for the whole layer, and the smallest difference value used to identify the portion as comprising fusing or non-fusing build material.

However, if it is determined in block 302 that the layer as a whole has just one distinct temperature zone, in block 310 it is determined that the portion of build material comprises non-fusing build material. This determination may be made on the basis that it is unlikely, in a practical object generation apparatus, that the whole of a layer of build material on a print bed can or will be fused simultaneously. Thus, if there is one temperature zone across an entire print bed or build material layer, that temperature zone may be concluded to be a non-fusing build material temperature zone.

Figure 4:
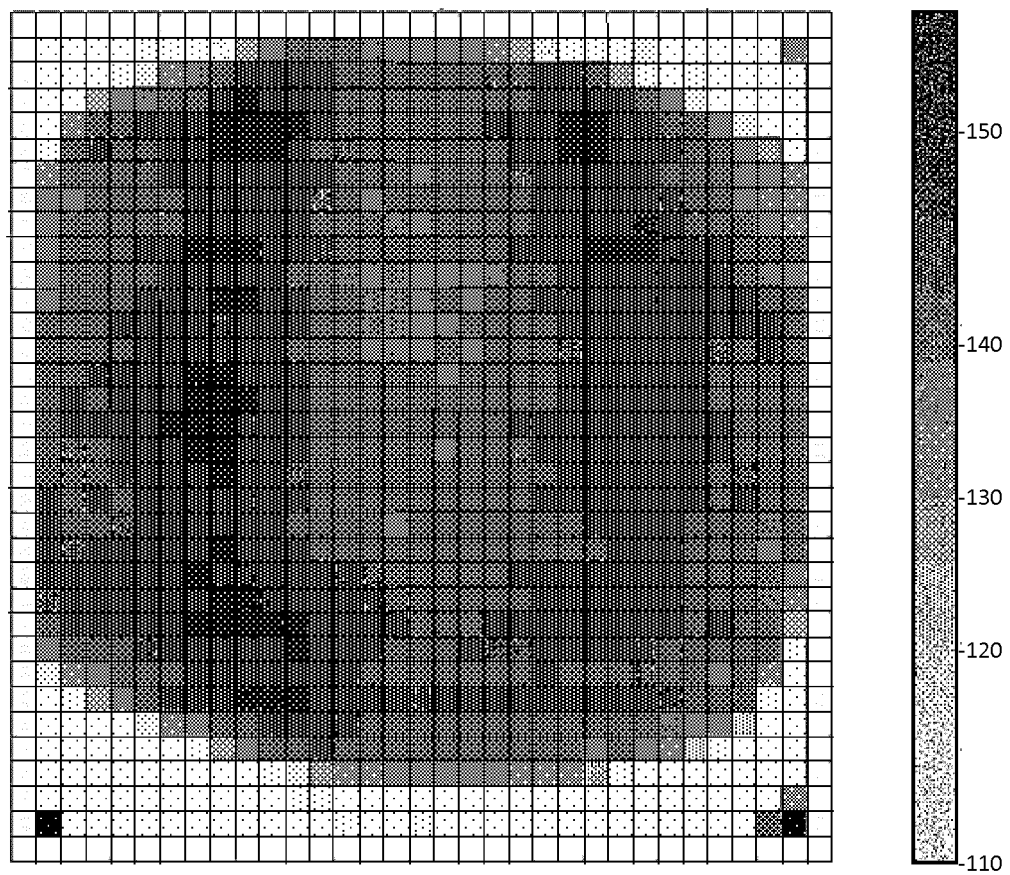
FIG. 4 is an example of a thermal image showing pixels representing different temperatures.

FIG. 4 shows an example of a thermal image of a layer of build material undergoing treatment to form two objects having substantially crescent shapes. The image is divided into pixels, in this example being substantially square pixels, each pixel having a temperature associated therewith, and in turn representing the temperature of a sub-region of the surface of the build material. In this example, the darker the pixel, the higher the temperature (as shown in the scale to the right of the Figure). It will be noted that, in the example of FIG. 4, there are some cooler pixels as well as anomalies in the corners. The cooler pixels may be seen, for example, because the build material does not extend into these regions, and therefore heat dissipation and convection are higher. In other examples, a thermal sensor may comprise at least one lens, which may in turn comprise aberrations which slightly affect the temperature readings when the infrared radiation is received from particular angles. An aberration compensation algorithm may be used to correct this, but this can cause anomalies in some pixels. However, where the nominal temperatures are determined based on the most populous bins in a frequency distribution, such anomalies, which affect a small number of pixels, will not adversely affect the determination of such temperatures (as for example may be the case if a simple average of pixel temperatures values was determined). In some examples, regions of a thermal image which do not represent build material and/or aberrations, for example unexpectedly hot or cold pixels which fall outside an anticipated temperature range, may be discarded prior to determining a frequency distribution.

Figure 5:
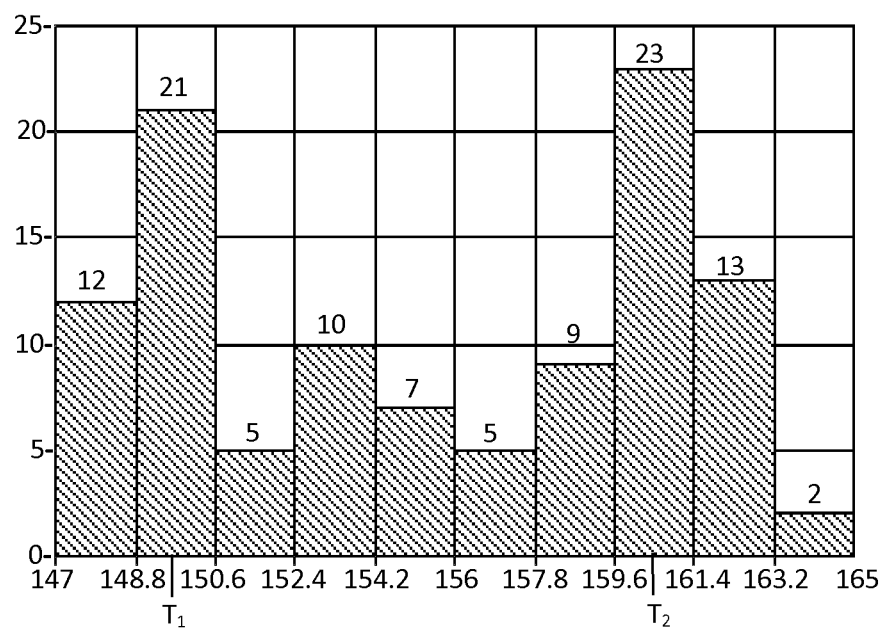
FIG. 5 is an example of a frequency distribution.

FIG. 5 shows a frequency distribution for the temperatures of sub-regions within a portion of build material. In the example of FIG. 5, there are 107 sub-regions of build material represented by 107 pixels of a thermal image. Taking this example, there is an average number of pixels per bin of 10.7. The mean average temperature (taking the centre point of a bin to represent the temperature of pixels therein is: 155.4299° C. The sum of squares, SS, for the distribution is 2916.22. This can be used to determine the variance $s^2$, according to the relationship:

$$s^2=SS/(N-1)=2916.22/(107-1)=27.51$$

The standard deviation s is the square root of the variance:

$$s=\sqrt{s^2}=\sqrt{27.51}=5.25$$

It is also possible to identify the two most populous temperature bins. These may be determined as including the biggest difference from the average number of sub-regions per bin. The centre point of these two bins is identified as the first and second temperature. In this example, the first temperature $T_1$ is 149.7° C. and the second temperature $T_2$ is 160.5° C. As in this example, the first and second temperature are separated by a separation coefficient which, in this example is set at 2s (i.e. two standard deviations), it is determined that the distribution is bimodal and there are two distinct temperature zones, having nominal temperatures 149.7° C. and 160.5° C. The higher of these temperatures in this example is the nominal fusing build material temperature zone.

Although 2s is used in the example above, other values may be used as a separation coefficient to identify that the peaks are distinct (i.e. that the temperature distribution is bimodal).

Figure 6:
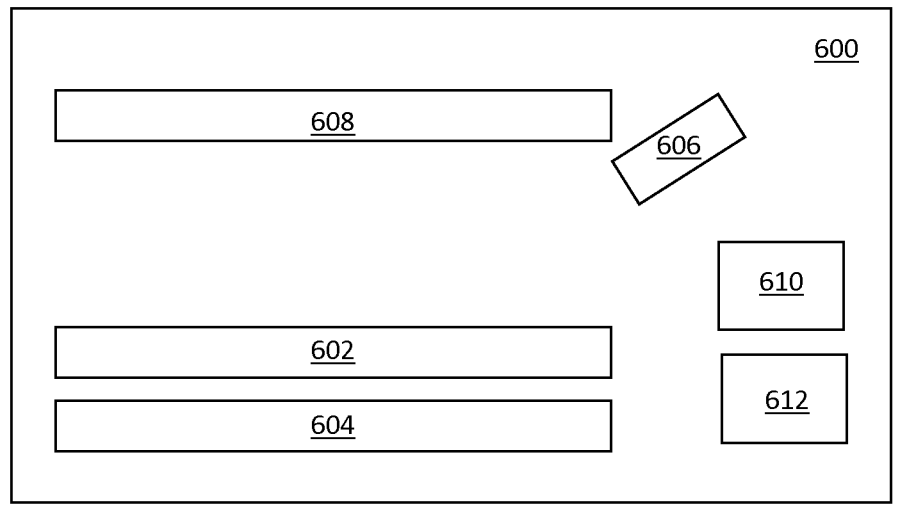
FIG. 6 is a simplified schematic of an example of an apparatus for object generation.

FIG. 6 is an example of object generation apparatus 600. The object generation apparatus 600 comprises a print bed 602, temperature control apparatus 604, an energy source 606, a temperature sensor 608, a processor 610 and a controller 612.

Figure 7:
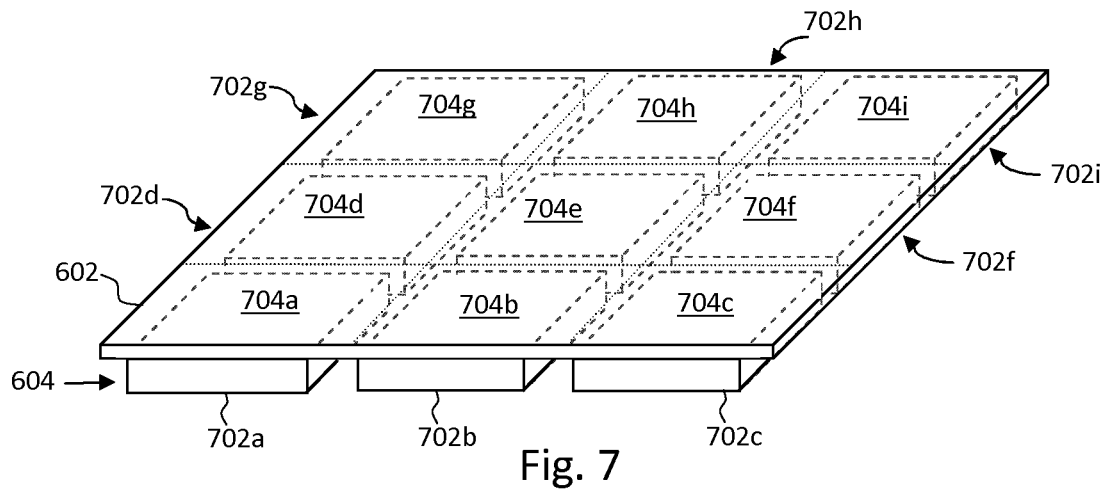
FIG. 7 is a simplified schematic of an example of a print bed associated with temperature control apparatus.

An example of a print bed 602 and associated temperature control apparatus 604 is shown in FIG. 7. The print bed 602 is to support fusible build material, and the temperature control apparatus 604 is to warm build material thereon. Warmed build material can be caused to selectively fuse with the application of a relatively small amount of energy supplied by the energy source 606. In some examples, the energy source 606 may also heat build material which is not to be fused, for example if heat will be preferentially absorbed or generated by build material to be fused (as may be the case if the build material is treated with an agent), and therefore, the energy source 606 and the temperature control apparatus 604 may be provided by a single heat lamp or the like, or one or both of an energy source and a temperature control apparatus may have overlapping functions, contributing to preheating and melting. In some examples, some preheating may be carried out by a build material spreading apparatus.

In this example, the temperature control apparatus 604 comprises a plurality of individual heating elements 702a-i, each of which is associated with a portion 704a-i of the print bed 604 and is intended to preheat the build material on that portion 704a-i. The energy source 606 is to cause selective fusing of the build material. The temperature sensor 608, which in this example is a thermal imaging camera, is to sense the temperature of a plurality of sub-regions of at least a portion of a layer of build material arranged on the print bed 602, and in this example is to sense the temperature over the whole print bed 602, and to assign temperatures to pixels, which are in turn associated with sub-regions of the portions 704a-i of the print bed 602 associated with an individual heat element 702a-i. This in effect provides a dedicated temperature sensor for each portion 704a-i, although in other examples, separate apparatus may be dedicated to sensing the temperature of each portion 704a-i. The controller 612 is to control the temperature of the temperature control apparatus 604, and in an example may control the temperature of an individual portion 704a-i via control of the associated element 702a-i.

The processor 610 is to derive a frequency distribution of pixel temperatures for pixels associated with a, or each, portion 704a-i, and to determine if the frequency distribution is bimodal. If the frequency distribution is not bimodal, the processor 610 is to identify a build material temperature zone. If however the frequency distribution is bimodal, the processor 610 is to identify a fusing build material temperature zone and a non-fusing build material temperature zone. The processor 610 is further to determine a nominal temperature of the at least one identified temperature zone. The processor 610 may for example be operated according to the methods outlined above in relation to any of FIGS. 1-3. If a determined nominal temperature differs from an anticipated temperature, the controller 612 may be used to control the temperature of the print bed 602/portion 704a-i thereof using the temperature control apparatus 604 such that the temperature tends towards the anticipated temperature.

Figure 8:
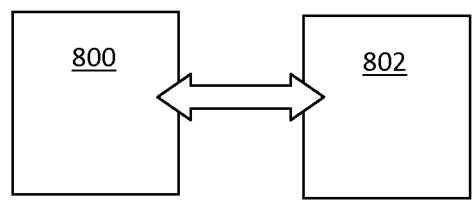
FIG. 8 is a simplified schematic of an example of a memory and a processor.

FIG. 8 shows an example of a processor 800 associated with a memory 802. In some examples the processor 800 may function as the processor 610 of the object generation apparatus 600. The memory 802 comprises a non-transitory machine readable medium comprising machine readable instructions which, when executed by the processor 800, cause the processor 800 to determine, from an indication of the temperature of a plurality of sub-regions of fusible build material in an object generation apparatus, a frequency distribution of sub-region temperatures; to identify if the frequency distribution is indicative of two temperature zones within the build material, or indicative of one temperature zone, the temperature zones being indicative of one of fusing build material or non-fusing build material; to determine a nominal temperature value of the at least one identified temperature zone; and to generate an output to control a temperature control device such that at least one nominal temperature value tends towards a predetermined value.

The memory 802 may further comprise instructions to cause the processor to determine the nominal temperature value of at least one temperature zone for each of a plurality of portions of a layer of build material (for example, for build material overlying a particular portion 704a-i of a print bed 602), and the output may be generated to control a temperature control device (for example a heating element 702a-i) associated with each portion such that at least one nominal temperature value determined for that portion tends towards a predetermined value.

The desired temperature may be dependent on the printing phase. For example, it may be that build material which is not treated so as to fuse remains an approximately stable temperature throughout object generation. Following distribution of an agent, the temperature of that agent (now applied to the build material) may be desired to reach its melting temperature. However, overheating (and resulting melting) any surrounding, untreated, build material should be avoided. Therefore a thermal balance may be maintained through temperature control apparatus (for example, the temperature control device 604 and/or the energy source 606) to ensure that treated material melts, without overheating the surrounding build material.

The instructions stored in the memory 802 may comprise instructions to determine that, if the portion of build material has two temperature zones, the portion of build material therefore comprises a non-fusing build material temperature zone and a fusing build material temperature zone. The memory 802 may also store instructions to determine, if the build material is determined to have one temperature zone, whether the temperature of that temperature zone is indicative of fusing build material or non-fusing build material.

The instructions to determine if the build material has two temperature zones stored in the memory 802 may comprise instructions to determine a first and second temperature, wherein the first and second temperatures have the two highest frequencies within the frequency distribution and, if the first and second temperatures are separated by at least twice the standard deviation of the frequency distribution, determining that there are two temperature zones.

The instructions to determine, for a portion of a layer of build material having one temperature zone, whether the temperature for that temperature zone is indicative of fusing build material or non-fusing build material may comprise (i) instructions to determine if the layer of build material as a whole has two temperature zones, and, if so, to determine that the build material comprises a non-fusing build material temperature zone and a fusing build material temperature zone, and therefore to determine a nominal temperature of the temperature zones, and to determine if the temperature of a temperature zone of the portion of build material matches the temperature of the fusing build material temperature zone or the non-fusing build material temperature zone; and (ii) instructions to determine if all portions of the build material has one temperature zone, and thereby to determine that the portion of build material comprises non-fusing build material.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus (for example the processor 610, 800) may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example, the memory 802) that can guide the computer or other programmable data processing devices (for example the processor 610, 800) to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices may realise functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
sensing the temperature of a plurality of sub-regions of a portion of a layer of build material in an object generation apparatus;
deriving a frequency distribution of sub-region temperatures;
determining if the frequency distribution is bimodal;
identifying, when the frequency distribution is not bimodal, a build material temperature zone;
identifying, when the frequency distribution is bimodal, a fusing build material temperature zone and a non-fusing build material temperature zone;
the method further comprising determining a nominal temperature of the at least one identified temperature zone.

2. A method according to claim 1 in which determining if the frequency distribution is bimodal comprises identifying the temperatures having the two highest frequencies within the frequency distribution as a first and second temperature, and, if the first and second temperatures are separated by at least a separation coefficient, determining that the frequency distribution is bimodal.

3. A method according to claim 1 comprising:
when the frequency distribution is not bimodal, determining whether the nominal temperature of the build material temperature zone is indicative of fusing build material or non-fusing build material.

4. A method according to claim 3 in which determining whether the nominal temperature of the temperature zone is indicative of fusing build material or non-fusing build material comprises sensing the temperature over the layer of build material and:
if the layer of build material has two distinct temperature zones, determining that the layer of build material comprises a non-fusing build material temperature zone and a fusing build material temperature zone, determining a nominal temperature of the temperature zones, and determining if the nominal temperature of a temperature zone of the portion of build material matches the nominal temperature of the fusing build material temperature zone or the nominal temperature of non-fusing build material temperature zone; or if the layer of build material has one distinct temperature zone, thereby determining that the portion of the layer of build material comprises non-fusing build material.

5. A method according to claim 1 in which deriving the frequency distribution comprises assigning a sub-region to a bin indicative of a range of temperatures.

6. A method according to claim 1 in which the nominal temperature is a central temperature in a temperature bin having a highest or second highest number of sub-regions therein.

7. A method according to claim 1 in which the nominal temperature is a mean of temperatures of the frequency distribution.

8. A method according to claim 1, further comprising determining a nominal temperature of multiple temperature zones.

9. An object generation apparatus comprising:
a print bed to support a build material;
a temperature control apparatus to control the temperature of at least a portion of build material arranged on the print bed;
an energy source to cause selective fusing of the build material;
a temperature sensor, to determine temperatures for pixels representing sub-regions of at least a portion of a layer of build material arranged on the print bed; and
a processor to:
derive a frequency distribution of pixel temperatures;
determine if the frequency distribution is bimodal;
identify, when the frequency distribution is not bimodal, a build material temperature zone;
identify, when the frequency distribution is bimodal, a fusing build material temperature zone and a non-fusing build material temperature zone; and
determine a nominal temperature of the at least one identified temperature zone.

10. An object generation apparatus according to claim 9, further comprising a controller to control the temperature control apparatus if a determined nominal temperature differs from an anticipated temperature.

11. An object generation apparatus according to claim 10 in which the temperature control apparatus comprises a plurality of heating elements, each heating element being to heat one of a plurality of portions of the layer of build material arranged on the print bed, wherein
the processor is to determine a nominal temperature of at least one temperature zone in the plurality of portions, and
the controller is to control the temperature of a heating element if a determined nominal temperature of the portion associated with that heating element differs from an anticipated temperature.

12. An object generation apparatus according to claim 11 in which a dedicated temperature sensor is provided for each portion.

13. An object generation apparatus according to claim 9 in which the temperature sensor comprises at least one of: an infrared sensor, a thermal camera; a thermopile array.

14. An object generation apparatus according to claim 9 wherein the processor is to compensate for aberrations for anomalies when determining temperatures for pixels representing sub-regions of at least a portion of a layer of build material.

15. A non-transitory machine-readable medium encoded with instructions executable by a processor and comprising instructions to:
determine, from an indication of the temperature of a plurality of sub-regions of build material in an object generation apparatus, a frequency distribution of sub-region temperatures;
identify whether the frequency distribution is indicative of two temperature zones within the build material, or indicative of one temperature zone, the temperature zones being indicative of one of fusing build material or non-fusing build material;
determine a nominal temperature value of the at least one identified temperature zone; and
generate an output to control a temperature control device such that at least one nominal temperature value tends towards a predetermined value.

16. A non-transitory machine-readable storage medium according to claim 15 in which the instructions to determine a nominal temperature value for at least one temperature zone are to determine at least one nominal temperature value for each of a plurality of portions of build material, and the instructions to generate an output are to generate an output to control a temperature control device associated with each portion such that at least one nominal temperature value determined for that portion tends towards a predetermined value.

17. A non-transitory machine-readable storage medium according to claim 15 further comprising:
instructions to determine, if a portion of build material is determined to have one temperature zone, whether the temperature of that temperature zone is indicative of fusing build material or non-fusing build material.

18. A non-transitory machine-readable storage medium according to claim 17 in which the instructions to determine whether, for build material having one temperature zone, the temperature for that temperature zone is indicative of fusing build material or non-fusing build material comprise:
instructions to determine if any portions of build material have two temperature zones, and, if so, to determine that the build material comprises a non-fusing build material temperature zone and a fusing build material temperature zone, instructions to determine a nominal temperature of the temperature zones, and instructions to determine if the temperature of a temperature zone of the portion of build material matches the temperature of the fusing build material temperature zone or the non-fusing build material temperature zone;
instructions to determine if all portions of the build material have one temperature zone, and thereby to determine that the portion of build material comprises non-fusing build material.

19. A non-transitory machine-readable storage medium according to claim 15 in which the instructions to determine if the frequency distribution is indicative of two temperature zones within the build material comprise instructions to determine a first and second temperature, wherein the first and second temperatures have the two highest frequencies within the frequency distribution; and instructions to determine if the first and second temperatures are separated by at least twice the standard deviation of the frequency distribution.

20. A non-transitory machine-readable storage medium according to claim 15 in which the predetermined value is dependent upon a printing phase.

* * * * *